US012756578B2

(12) United States Patent
Be'ery et al.

(10) Patent No.: US 12,756,578 B2
(45) Date of Patent: Oct. 6, 2026

(54) SYSTEM AND METHOD OF SECURED DIGITAL ASSET TRANSFER IN A COMPUTER NETWORK

(71) Applicant: ZENGO LTD, Tel Aviv (IL)

(72) Inventors: Tal Arieh Be'ery, Petach Tikva (IL); Michael-David Fiszer, Tel Aviv (IL); Menahem Cherbakovsky, Rehovot (IL); Iraklis Leontiadis, Lausanne (CH); Jeremy Martiano, Jerusalem (IL); Rachel Barkay, Tel Aviv (IL)

(73) Assignee: ZENGO LTD, Tel Aviv (IL)

( * ) Notice: Subject to any disclaimer, the term of this patent is extended or adjusted under 35 U.S.C. 154(b) by 133 days.

(21) Appl. No.: 18/396,748

(22) Filed: Dec. 27, 2023

(65) Prior Publication Data

US 2025/0219843 A1 Jul. 3, 2025

(51) Int. Cl.

| | |
|---|---|
| ***H04L 29/06*** | (2006.01) |
| ***H04L 9/00*** | (2022.01) |
| ***H04L 9/08*** | (2006.01) |
| ***H04L 9/32*** | (2006.01) |

(52) U.S. Cl.

CPC ............ *H04L 9/3247* (2013.01); *H04L 9/008* (2013.01); *H04L 9/085* (2013.01); *H04L 2209/46* (2013.01)

(58) Field of Classification Search

None

See application file for complete search history.

(56) References Cited

U.S. PATENT DOCUMENTS 7,380,120 B1 * 5/2008 Garcia ................ G06F 21/6227 713/168
8,370,362 B2 * 2/2013 Szabo ................ G06Q 30/0269 707/739
8,683,602 B2 * 3/2014 Waller .................... G06F 21/10 380/278
9,959,694 B2 * 5/2018 Lindsay .................. G06F 21/31
10,277,563 B2 * 4/2019 Rao ..................... H04L 63/0435
10,574,442 B2 * 2/2020 Amiri ................... H04L 9/0822
2018/0084069 A1 * 3/2018 Be'ery .................. H04L 67/535
2019/0392407 A1 12/2019 Keskar
2022/0092193 A1 * 3/2022 Nijasure ............... G06F 21/602
2022/0337400 A1 10/2022 Be'ery et al.
2024/0171393 A1 * 5/2024 Bathen .................. H04L 9/3236

* cited by examiner

*Primary Examiner* — Maung T Lwin

(74) *Attorney, Agent, or Firm* — PEARL COHEN LLP

(57) ABSTRACT

A method for digital asset transfer between an owner of the digital asset and a designated receiver is provided. The digital asset transfer can involve receiving from the owner of the digital asset an encrypted digital asset, wherein the encrypted digital asset is encrypted by a cryptographic key and a release criteria, upon which the owner of the encrypted digital asset is to transfer the encrypted digital asset. A decryption key can be received to decrypt the encrypted digital asset, wherein the decryption key is received from the owner of the encrypted digital asset, and wherein the decryption key corresponds to the cryptographic key. When the release criteria is met, the encrypted digital asset can be sent to the designated receiver.

16 Claims, 3 Drawing Sheets

SYSTEM AND METHOD OF SECURED DIGITAL ASSET TRANSFER IN A COMPUTER NETWORK

FIELD OF THE INVENTION

The present invention relates to management of cryptographic keys and transfer of digital assets. More particularly, the present invention relates to systems and methods for secured digital asset transfer in a computer network.

BACKGROUND OF THE INVENTION

In recent years, various aspects of our lives have become digital and as a result digital assets have become common as well. Some examples of digital assets are personal media (e.g., pictures, videos, audio) or financial access (e.g., cryptographic assets).

While digital assets are commonly used today, there is no mechanism or solution for transfer of digital legacy in case of need, such as death (e.g., compared to wills for non-digital assets).

For digital assets, while the original owners of the digital assets still own their assets, these digital assets are usually considered highly private and not shared with anyone, including the designated receiver. For example, a digital asset may include a cryptographic coin or a digital copy of a non-published novel.

Some current solutions allow owners of digital assets to share their assets with the designated receivers, either as copy of data directly, or a key to the encrypted data (as naïve sharing). However, such solution compromises the owners' privacy as the receivers are technically capable of viewing the data before the transfer criteria are met. Additionally, such solution does not allow the receiver to be revoked, in case it is desired by the owner of the digital asset.

Another current solution, allows transfer via a trusted third party, where the trusted third party can either hold a copy of the data directly, or a key to the encrypted data and release it to the designated receiver when the transfer criteria are met. A major disadvantage of this solution is that this service can gain access to owner personal data, if it becomes rogue, hacked, etc.

In order to achieve secure transfer of a digital asset, once a transfer criterion is met the digital assets can be transferred immediately to the possession of the designated receiver. It would therefore be advantageous to have a mechanism to allow automatic transfer of digital assets.

SUMMARY OF THE INVENTION

In one aspect, the invention involves a method of digital asset transfer between an owner of the digital asset and a designated receiver. The method can involve receiving, by a server, from the owner of the digital asset an encrypted digital asset, wherein the encrypted digital asset is encrypted by a cryptographic key, and a release criteria, upon which the owner of the encrypted digital asset is to transfer the encrypted digital asset. The method can involve receiving, by the designated receiver, a decryption key to decrypt the encrypted digital asset, wherein the decryption key is received from the owner of the encrypted digital asset, and wherein the decryption key corresponds to the cryptographic key. The method can involve determining, by the server, that the release criteria is met. The method can involve sending, by the server, the encrypted digital asset to the designated receiver.

In some embodiments, the method can involve verifying that the decryption key is capable of decrypting the encrypted digital asset to retrieve the digital asset. In some embodiments, wherein the decryption key is received via a second server associated with the designated receiver, and wherein the decryption key is not accessible to the owner of the digital asset. In some embodiments, the server monitors digital activity of the owner of the digital asset with the server.

In some embodiments, the release criteria is based on activity of the owner of the digital asset. In some embodiments, the server authenticates the identity of each of the owner of the digital asset and the designated receiver. In some embodiments, the server monitors digital activity of the designated receiver.

In some embodiments, the owner of the digital asset selects an address of the designated receiver for designation of the digital asset to the designated receiver.

In some embodiments, the release criteria is time based. In some embodiments, the digital asset is another cryptographic key for another digital asset. In some embodiments, the encryption of the digital asset is generated in a two-party threshold signatures setup.

In some embodiments, the method can involve revoking, by the server, the encrypted digital asset upon instructions from the owner to delete the encrypted digital asset. In some embodiments, the method can involve enforcing transfer of the digital asset upon determination that the release criteria is met.

In some embodiments, the method can involve generating, by a computing device of the owner of the digital asset, a first share of the cryptographic key, based on a multi-party computation (MPC) protocol. The method can also involve generating, by the server, a corresponding second share of the cryptographic key, based on the MPC protocol, wherein the cryptographic key corresponds to a public key and private key pair, and wherein the private key is configured to decrypt shares of the cryptographic key that are encrypted by the public key. The method can also involve signing, by the computing device, the encrypted digital asset with the first share. The method can also involve receiving, by the server, the encrypted digital asset signed with the first share. The method can also involve signing, by the server, the encrypted digital asset signed with the first share, with the second share.

In some embodiments, the method can involve communicating with an external server to retrieve authentication data for recovery for at least one of the server and a computing device of the owner of the digital asset.

In some embodiments, the method can involve storing the decryption key at the external server, detecting that the server is offline, sending the decryption key to the computing device, and authenticating the decryption key by the computing device.

In some embodiments, the method can involve storing the encrypted digital asset and release criteria at the external server, detecting that the computing device is offline, sending the encrypted digital asset and release criteria to the server, and authenticating the encrypted digital asset and release criteria by the server.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
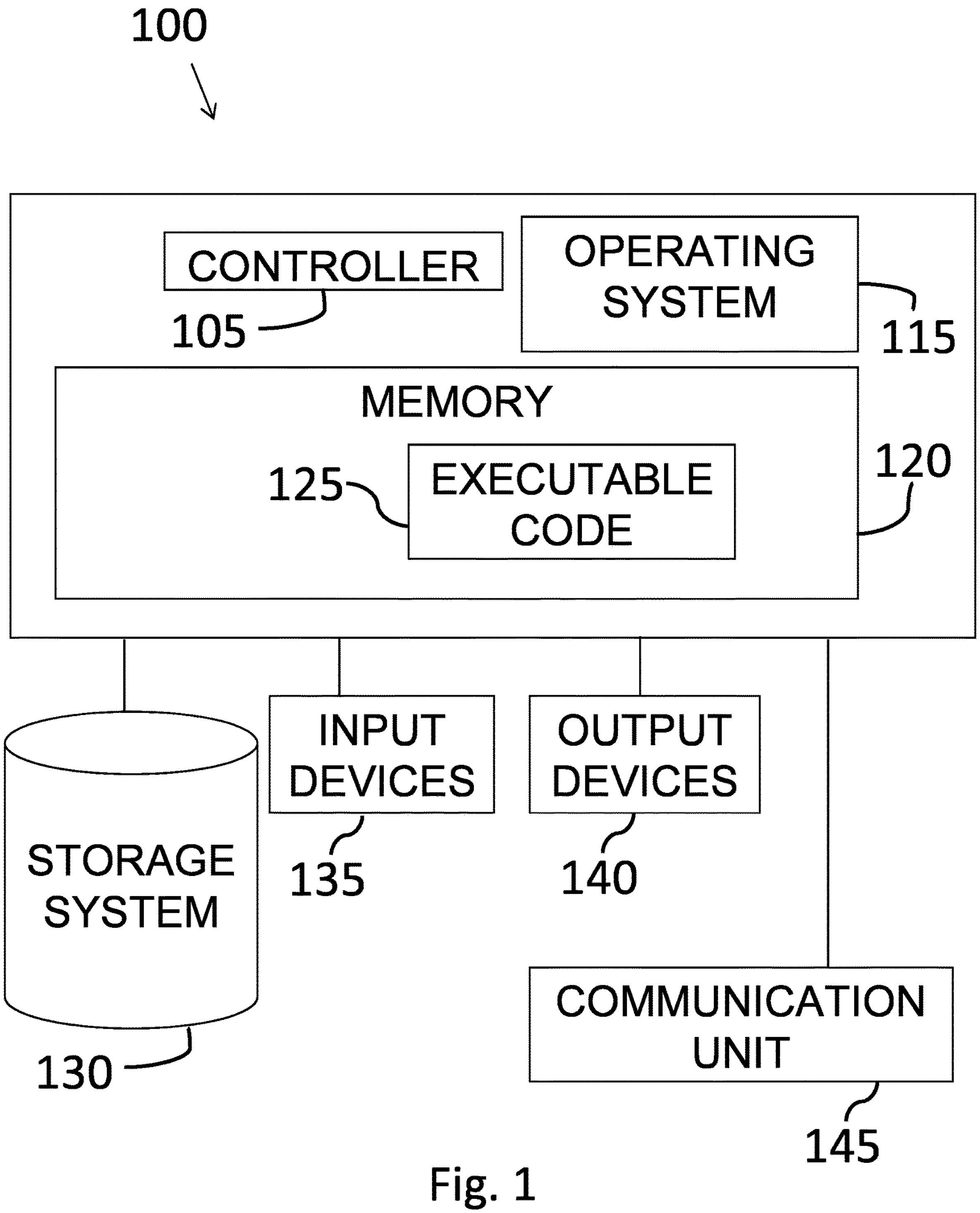
FIG. 1 shows a block diagram of a computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof may occur or be performed simultaneously, at the same point in time, or concurrently.

Reference is made to FIG. 1, which is a block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet.

Controller 105 may be configured to execute program code to perform operations described herein. The system described herein may include one or more computing device(s) 100, for example, to act as the various devices or the components shown in FIG. 2. For example, communication system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 are omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein.

The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components.

In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2:
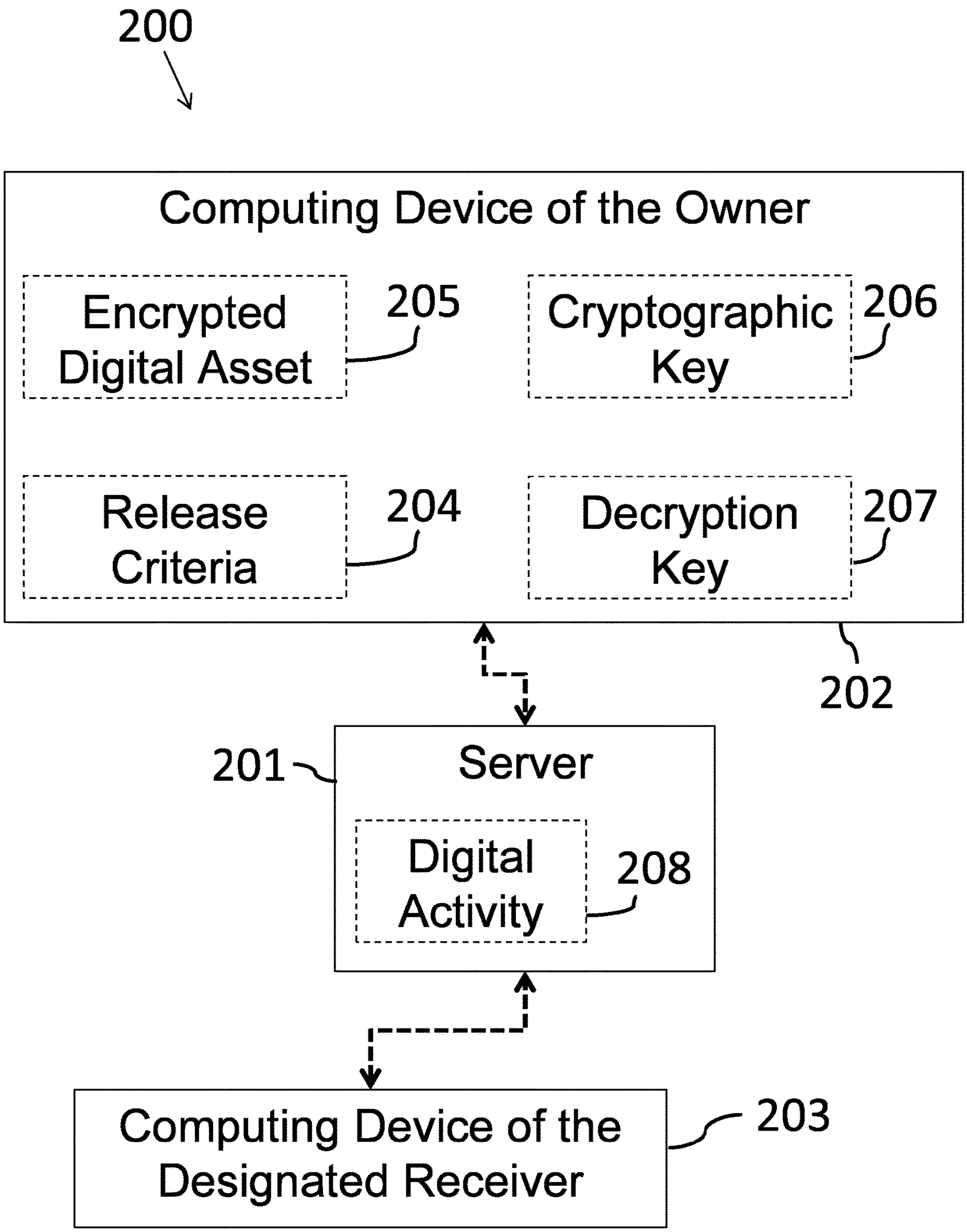
FIG. 2 shows a block diagram of a system digital asset transfer between an owner of the digital asset and a designated receiver, according to some embodiments of the invention.

Reference is now made to FIG. 2, which shows a block diagram of a system 200 for digital asset transfer between an owner of the digital asset and a designated receiver, according to some embodiments of the invention. In FIG. 2, hardware elements are indicated with a solid line and the direction of arrows indicate a direction of information flow between the hardware elements.

The system 200 may include a server 201 for transfer of data between a first computing device of the owner of the digital asset 202 and a second computing device of the designated receiver 203. For example, the first computing device of the owner and/or the second computing device of the designated receiver may be computing devices such as the computing device 100 shown in FIG. 1.

As opposed to the aforementioned trusted third-party service with previous solutions, the server 201 in this system is not "trusted" in the sense that it cannot access the owner's asset (or secret). Only an encrypted version of the owner's asset may be provided to the server.

In some embodiments, the server 201 may ensure digital asset transfer between an owner of the digital asset and a designated receiver based on monitoring of a release criteria 204 that is predefined by the owner of the digital asset. The release criteria 204 may be time based or activity based.

For example, the release criteria 204 may include conditions for digital activity of the owner and if the owner is not active for a predefined time (e.g., 10 months) the digital asset, for instance assets of a company, may be transferred. In another example, the release criteria 204 may be the death of the owner (e.g., triggered by submitting of legal documents to the server) so that the designated receiver may receive the digital asset, as carried out with wills for non-digital assets.

The owner of the digital asset and the designated receiver may for instance use a dedicated algorithm (e.g., via a mobile app) and carried out via the server 201, in which users are identified with some identifier (e.g., an email address) and are assigned with some cryptographic secret (e.g., assigned with a private cryptographic key).

The digital asset may also be another cryptographic key for another digital asset.

For example, a use case for such digital legacy asset transfer may be in the context of blockchains' cryptographic assets, where the digital asset or secret is the owner's private cryptographic key. In another example, the digital asset or secret may be at least one share (or portion) of the cryptographic key in a Multi-Party Computation (MPC) system where multiple shares of the cryptographic key are distributed.

In some embodiments, a computing device of the owner of the digital asset 202 may generate a first share of the cryptographic key, based on a multi-party computation (MPC) protocol. The server may accordingly generate a corresponding second share of the cryptographic key, based on the MPC protocol, wherein the cryptographic key corresponds to a public key and private key pair, and wherein the private key is configured to decrypt shares of the cryptographic key that are encrypted by the public key. The computing device of the owner of the digital asset 202 may sign the encrypted digital asset 205 with the first share, and the server may receive the encrypted digital asset signed with the first share, and accordingly sign the encrypted digital asset signed with the first share, with the second share.

When an owner of a digital asset wants to designate some user as their designated receiver, the owner may leverage the shared server to do so, by specifying the designated receiver and a criterion for the transfer. The transfer criteria may depend on a variety of parameters, but some examples may be the lapse of owners' predefined inactivity period or the presentation of legal documents by the designated receiver, proving the owner has passed away and is therefore no longer active with the digital asset.

In some embodiments, both the owner and designated receiver may install a dedicated application on the computing device of the owner of the digital asset 202 and the computing device of the designated receiver 203, respectively, and create their accounts within the shared server (that is associated with the shared server). The dedicated application may automatically generate a secret (at a "creation" phase), then the owner may perform the "designation" phase of designating the receiver to be the recipient of its digital legacy (for instance and specifying the release criteria).

The creation phase may include creating a new account for the owner of the digital asset as well as for the designated receiver within the dedicated application (e.g., identifying with their email addresses). The secret may accordingly be generated for each new user of the dedicated application, where the secret may include at least one of the following: a symmetric key generation, a private-public cryptographic key generation, a Threshold Signature Scheme (TSS) key generation that is performed between the owner and server. Portions of the cryptographic key may be distributed based on the Multi-Party Computation (MPC) algorithm.

The designation of the receiver may include the owner selecting to designate the owner's account (e.g., of the dedicated application) to a future receiver. The owner accordingly defines a designated receiver by specifying their identification and/or a transfer criterion such as defining an inactivity period.

For example, the owner of the digital asset may select an address of the designated receiver for designation of the digital asset to the designated receiver.

At this stage the key portion of the owner may be securely shared with all other members of the account, by locally generating on the computing device of the owner of the digital asset 202, a new encryption/decryption keys (either symmetric or asymmetric). The owner may encrypt the digital asset or secret with that encryption key and send the encrypted owner's secret to the server 201. An invite may be sent to the designated receiver (e.g., via email). This invite may include the decryption key that corresponds to the encryption key used to encrypt the encrypted secret. As a result, neither the server nor the designated receiver has access to the owner's secret at this stage.

Thus, the designated receiver may save the decryption key and update the server that it completed the designation phase and this information may be passed to the owner's computing device, so that both owner and designated receiver may be assured the designation phase is successfully completed. Once the designation phase is successfully completed, the owner may forget their encryption/decryption keys since only the designated receiver may use it in the future while the owner has the original decrypted digital asset at this stage.

According to some embodiments, the server 201 may receive from the computing device of the owner of the digital asset 202, an encrypted digital asset 205, that is encrypted by a cryptographic key 206. The server 201 may further receive from the computing device of the owner of the digital asset 202, the release criteria 204, upon which the owner of the encrypted digital asset is to transfer the encrypted digital asset 205.

For example, the release criteria 204 may be time based (e.g., release after 20 years) and accordingly provide a way for confidential secrets delayed transfer protocol for users, allowing them to transfer secrets in due time.

In some embodiments, the computing device of the designated receiver 203 may receive a decryption key 207 that corresponds to the cryptographic key 206 in order to decrypt the encrypted digital asset 205. The decryption key 207 may be received from the owner of the encrypted digital asset 205, for instance received via the server 201 or received directly from the computing device of the owner of the digital asset 202.

According to some embodiments, the server 201 may verify that the decryption key 207 is capable of decrypting the encrypted digital asset 205 to retrieve the digital asset. For example, the computing device of the designated receiver 203 may receive a verification notification from the server 201 once the decryption key 207 is verified.

In some embodiments, at this stage, the computing device of the designated receiver 203 only has the decryption key 207 but not the encrypted digital asset 205, while the server 201 has the encrypted digital asset 205 to be shared once the release criteria 204 is met.

For example, the release criteria 204 may be time based and/or associated with digital activity 208 of the computing device of the owner of the digital asset 202. The server may monitor digital activity of the owner of the digital asset with the server, and/or activity of the designated receiver, for instance when the monitored digital activity is below a predefined threshold (e.g., not active for a whole month) the release criteria may be met.

In some embodiments, the decryption key 207 may be received via a second server (a commercial server for other service providers) associated with the designated receiver, and wherein the decryption key 207 is not accessible to the owner of the digital asset.

When the release criteria 204 is met, the server 201 may facilitate the digital transfer of the owner's cryptographic secret to the designated receiver.

The designated receiver may accordingly use this cryptographic secret directly (e.g., if it is a blockchain's private key) or indirectly to enable access to encrypted data (e.g., to decrypt the owner's encrypted data).

Once the "designation" phase (e.g., designating the receiver has occurred, an additional feature may be utilized, but before the transfer phase (e.g., when the asset is actually transferred) for transfer of the digital asset to the designated receiver. For example, the owner may revoke the receiver designation (e.g., at a "revocation" phase) by directing the server 201 to purge the encrypted digital asset 205 from the server's database. In such a case, the designated receiver may be notified (e.g., with an automatic notification) that it is no longer the designated receiver. For example, the server may revoke the encrypted digital asset upon instructions from the owner to delete the encrypted digital asset.

In another example, each of the owner and the designated receiver may recover from the loss of their application after the "designation" phase had occurred but before "transfer" phase in order to recover their secrets and/or data relevant for the legacy transfer. After such recovery, both the owner and the designated receiver may be ready for the transfer phase.

In case that the recovery phase is required/desired, for instance if the computing device of the owner of the digital asset 202 and/or the computing device of the designated receiver 203 is damaged and no longer accessible, the application data may be recovered utilizing the recovery feature. The owner may perform personal recovery such that digital legacy information (e.g., transfer criteria, owner and receiver) may be persisted on the server and may be sent to the user when recovered. The designated receiver may securely back-up all decryption keys in advance (whether created by the designated receiver or shared with the designated receiver) and recover them accordingly.

This solution solves the common use case of users losing access to their application, allowing them to recover their secrets securely. This feature is very important in long-term relationships, such as digital legacy transfers, that may last for decades until the transfer criteria are met.

In some embodiments, the system 200 allows recovery of the at least one of the computing device of the owner of the digital asset 202 through know your customer (KYC) authentication. The owner and/or designated receiver may create authentication data on the server side, for instance using a third-party KYC service such that the customer may validate its identity. The computing device of the designated receiver 203 may receive verified real-world details (e.g., name, date of birth, address, face recognition data, etc.) of the owner. In some embodiments, the owner may generate a key pair with a randomized passphrase to protect the private key and send a certificate signing request (CSR) to server in order to create a transport layer security (TLS) certificate. The server may send the TLS certificate to the owner, and send the certificate with an encrypted private key to the server for the server to store. The owner may store the passphrase (e.g., which may serve as a recovery secret) in plaintext, for instance on cloud storage, and then if the passphrase is forgotten or lost, recovery may be possible. In case that the owner has lost its device and wants to recover its account, the owner may provide a username, and the server may present alternative authentication option, such as, for example: KYC, single sign on (SSO), and the like, and the owner may recover the passphrase, for instance from cloud storage.

The owner may authenticate its identity to the server with the relevant authentication method: for instance providing KYC details again through a third-party service. If authentication is successful, and the KYC details are verified and matching the details established on the on-boarding phase then the server may send to the owner relevant owner key share (e.g., with an encrypted version) and the certificate with encrypted private key such that the owner may decrypt the encrypted private key and regenerate its key pair. Using the decrypted private key, the owner may decrypt the encrypted owner share and may finally regain control of its blockchain assets.

In some embodiments, the owner may be provided with an encrypted version of the server's share of the cryptographic key, which corresponds to the owner share, where the server's share may be encrypted with a public key. The owner may thus be able to verify that indeed the encrypted server share is matching its share, using the "public share verifiability" property. The server's recovery private key may be saved by an external recovery party (e.g., by an external server), and when the recovery party determined that the server is unavailable, it may release the server's recovery private key.

In some embodiments, the server recovery key pair may be generated on an offline computer, where the secret may be split using secret sharing scheme (e.g., Shamir secret sharing, SSS). The parts of the secret (e.g., shares of the cryptographic key) may be then transferred, for instance via flash drive, to the centralized entities for storing at a cold storage (e.g., a safe).

In some embodiments, users of system may use the server recovery private key, decrypt the server's recovery share and recreate their private keys to export them as Hexadecimal strings or mnemonics code that may be imported into other algorithms, thereby creating full recovery and universality properties for blockchain networks.

In case that the server recovery key pair is created offline, the server recovery public key may be sent to the designated receiver and may be publicly posted while the server recovery private key may be securely transferred to the recovery party. In some embodiments, on the initial key generation event, and every event where the shares change (e.g., rotation), the server may encrypt its share with the server recovery public key, with the encrypted share sent to the client. The owner may receive the encrypted server share and verify that it matches its own owner share using the "public server recovery public key "verifiability" property to store the encrypted share on the same storage as the owner share.

In some embodiments, the computing device of the owner may include code that may locally restore the private key that the two shares represent, given the server share, such that when server recovery is required, the recovery party may release the private key corresponding to the server's share. The owner may then download the private key from the corresponding URL address and decrypt the encrypted server recovery share. Finally, the computing device of the owner may restore the private key associated with the account and export it as Hexadecimal representation so the users of the system may import it to dedicated cryptocurrency wallets and/or other algorithms of their choice.

According to some embodiments, at least one of the computing device of the owner of the digital asset 202 and the computing device of the designated receiver 203 may communicate with an external server to retrieve authentication data for recovery for at least one of the server and the computing device of the owner of the digital asset 202.

The decryption key 207 may be stored at the external server, and once the server 201 is identified as being offline, the decryption key 207 may be sent to the computing device of the designated receiver 203 and authenticate the decryption key 207 by the computing device of the designated receiver 203.

The encrypted digital asset 205 and release criteria 204 may be stored at the external server, and once the computing device of the owner of the digital asset 202 is identified as being offline, the encrypted digital asset 205 and release criteria 204 may be sent to the server 201 and authenticated for the encrypted digital asset 205 and release criteria 204 by the server 201.

In some embodiments, once the server 201 determines that the release criteria 204 is met, the server 201 may send the encrypted digital asset 205 to the computing device of the designated receiver 203 for decryption with the decryption key 207. The designated receiver may accordingly decrypt the encrypted secret and receive the digital legacy, either directly, e.g., the secret is the digital legacy itself, or indirectly where the secret is a cryptographic key that is used to decrypt the digital legacy encrypted data stored elsewhere.

According to some embodiments, the server 201 may enforce transfer of the digital asset upon determination that the release criteria is met.

In a user-server setup, when owner and designated receiver that share the same server want to setup a future digital legacy transfer, they may leverage their shared server to securely manage the full lifecycle of that relationship. Thus, the shared server may perform at least one of: creation, designation, revocation, setting transfer criteria and the actual transfer of the owner's secret to the designated receiver.

The encryption of the digital asset may be generated in a two-party threshold signatures setup. For example, in a two-party threshold signatures setup, when multiple users that share the same server want to setup a digital legacy transfer for the control of digital asset(s) on multiple blockchains, they may leverage their shared server for the digital legacy transfer.

A specific application of this solution is in a threshold signature and/or MPC based key management system for blockchain networks. Users of such systems, may securely setup a digital legacy transfer, without changing their trust model. The server (even if it becomes rogue) cannot access their secrets and spend assets, and the server may block the users from access to secrets, but is financially motivated not to do so. Specifically no new entity is introduced, the server cannot access users' secrets and spend users' funds, and the server validates the transfer criteria.

In some embodiments, by leveraging the server, digital legacy transfer parties (the owner and the designated receiver) do not have to be online simultaneously for any required action, as the server may preserve the state and page the users when they are online so they can complete the required action.

Figure 3:
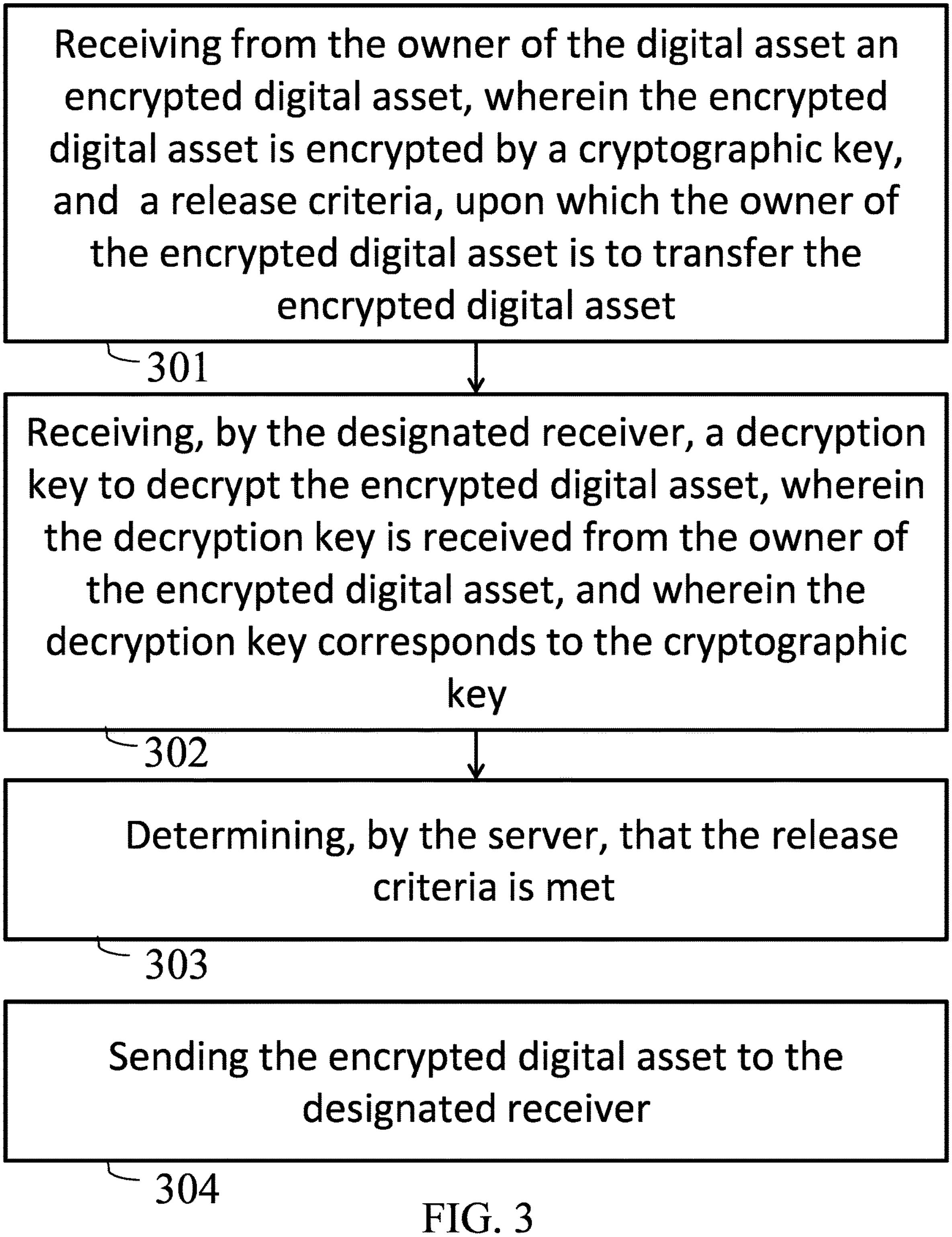
FIG. 3 shows a flowchart of a method of digital asset transfer between an owner of the digital asset and a designated receiver, according to some embodiments of the invention.

Reference is now made to FIG. 3, which shows a flowchart for a method of digital asset transfer between an owner of the digital asset and a designated receiver, according to some embodiments of the invention.

At stage 301, the server may receive from the owner of the digital asset: an encrypted digital asset, wherein the encrypted digital asset is encrypted by a cryptographic key, and a release criteria, upon which the owner of the encrypted digital asset is to transfer the encrypted digital asset.

At stage 302, the designated receiver may receive a decryption key to decrypt the encrypted digital asset, wherein the decryption key is received from the owner of the encrypted digital asset, and wherein the decryption key corresponds to the cryptographic key.

At stage 303, the server may determine that the release criteria is met, and at stage 304 the server may send encrypted digital asset to the designated receiver.

While certain features of the invention have been illustrated and described herein, many modifications, substitutions, changes, and equivalents may occur to those skilled in the art. It is, therefore, to be understood that the appended claims are intended to cover all such modifications and changes.

Various embodiments have been presented. Each of these embodiments may of course include features from other embodiments presented, and embodiments not specifically described may include various features described herein.

The invention claimed is:

1. A method of digital asset transfer between a first computing device of an owner of the digital asset and a second computing device of a designated receiver, the method comprising:

receiving, by a server, from the first computing device:

an encrypted digital asset, wherein the encrypted digital asset is encrypted by a cryptographic key; and a release criteria, upon which the encrypted digital asset is to be released and transferred;

receiving, by the second computing device, a decryption key to decrypt the encrypted digital asset, wherein the decryption key is received from the first computing device, and wherein the decryption key corresponds to the cryptographic key;

monitoring, by the server, digital activity of the first computing device with the server over time;

determining, by the server, that the release criteria is met, by determining that no digital activity of the first computing device with the server has been detected for at least a predefined inactivity period; and sending, by the server, the encrypted digital asset to the second computing device.

2. The method of claim 1, further comprising verifying that the decryption key is capable of decrypting the encrypted digital asset to retrieve the digital asset.

3. The method of claim 1, wherein the decryption key is received via a second server associated with the designated receiver, and wherein the decryption key is not accessible to the first computing device.

4. The method of claim 1, wherein the server authenticates the identity of each of the owner of the digital asset and the designated receiver.

5. The method of claim 1, wherein the server monitors digital activity of the second computing device.

6. The method of claim 1, wherein the owner of the digital asset selects an address of the designated receiver for designation of the digital asset to the designated receiver.

7. The method of claim 1, wherein the digital asset is different cryptographic key for a second digital asset.

8. The method of claim 7, wherein the encryption of the digital asset is generated in a two-party threshold signatures setup.

9. The method of claim 1, further comprising revoking, by the server, the encrypted digital asset upon instructions from the owner of the digital asset to delete the encrypted digital asset.

10. The of claim 1, further comprising enforcing transfer of the digital asset upon determination that the release criteria is met.

11. The method of claim 1, further comprising:

generating, by the first computing device, a first share of the cryptographic key, based on a multi-party computation (MPC) protocol;

generating, by the server, a corresponding second share of the cryptographic key, based on the MPC protocol, wherein the cryptographic key corresponds to a public key and private key pair, and wherein the private key is configured to decrypt shares of the cryptographic key that are encrypted by the public key;

signing, by the first computing device, the encrypted digital asset with the first share;

receiving, by the server, the encrypted digital asset signed with the first share; and signing, by the server, the encrypted digital asset signed with the first share, with the second share.

12. The method of claim 1, further comprising communicating with an external server to retrieve authentication data for recovery for at least one of the server and the first computing device.

13. The method of claim 12, further comprising:

storing the decryption key at the external server;

detecting that the server is offline;

sending the decryption key to the first computing device; and authenticating the decryption key by the first computing device.

14. The method of claim 12, further comprising:

storing the encrypted digital asset and release criteria at the external server;

detecting that the first computing device is offline;

sending the encrypted digital asset and release criteria to the server; and authenticating the encrypted digital asset and release criteria by the server.

15. The method of claim 1, further comprising revoking, by the server, designation of the designated receiver upon instructions from the owner of the digital asset to delete the encrypted digital asset.

16. The method of claim 1, further comprising:

generating a new account for the owner of the digital asset, by a dedicated application on the first computing device, wherein the new account is shared with the designated receiver, by the dedicated application on the second computing device;

generating, by the server, a secret for each new account of the dedicated application, wherein the generated secret is selected from the group consisting of at least one of: a symmetric key generation, a private-public cryptographic key generation, and a Threshold Signature Scheme (TSS) key generation that is performed between the first computing device and the server; and sharing the decryption key with the first computing device and the second computing device.

* * * * *